April 24, 1934.   E. L. FIX ET AL   1,956,168
APPARATUS FOR MAKING COMPOSITE GLASS
Filed April 16, 1930
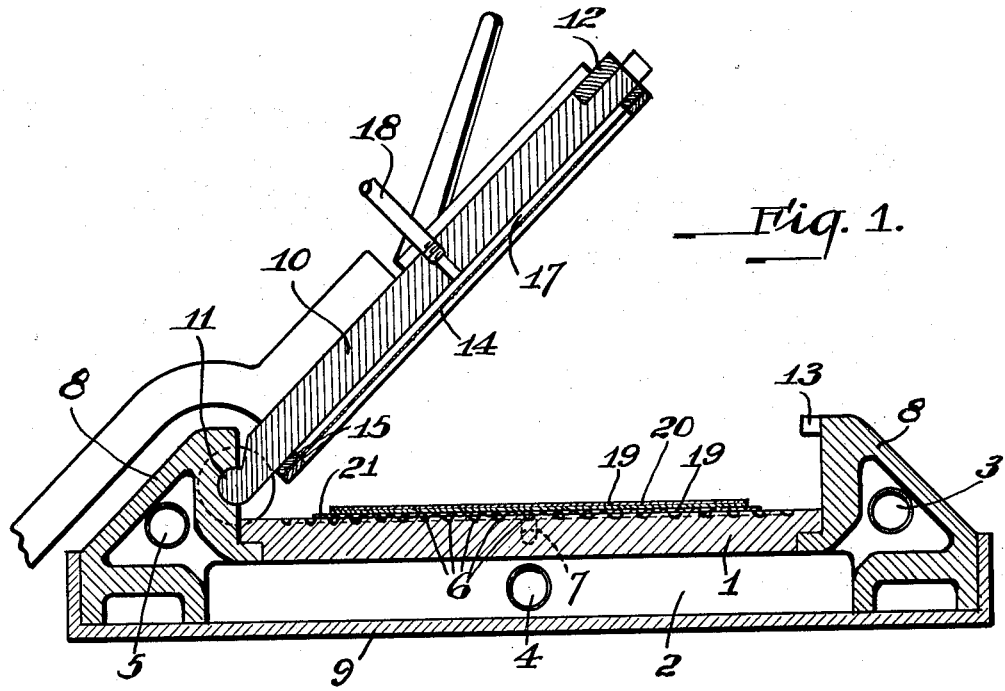
Fig. 1.
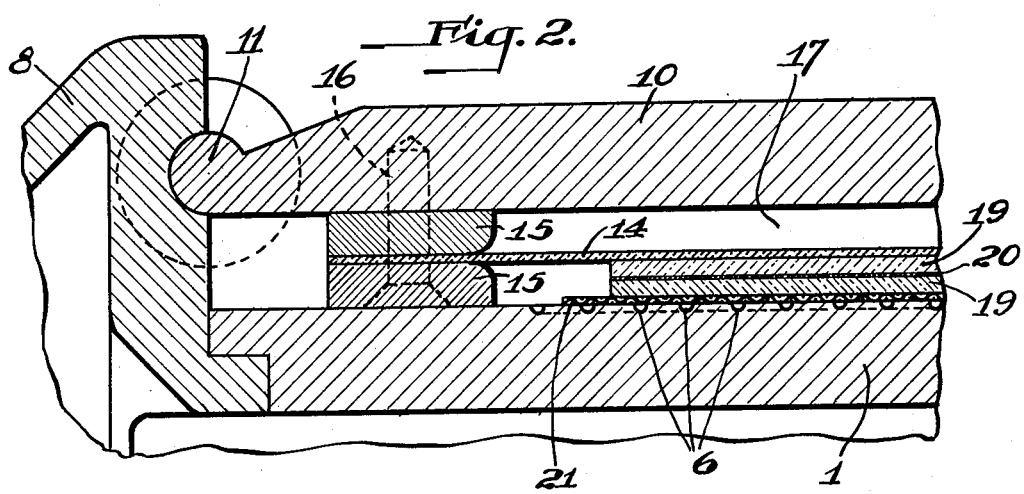
Fig. 2.
Fig. 3.
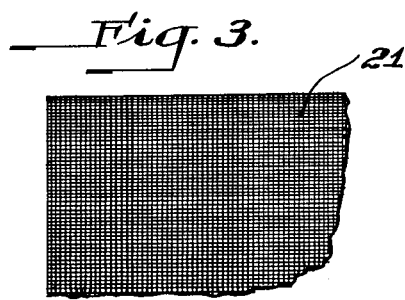
INVENTORS
Earl L. Fix
and
Brook J. Denman
by James C. Bradley
atty Patented Apr. 24, 1934

1,956,168

UNITED STATES PATENT OFFICE 1,956,168

APPARATUS FOR MAKING COMPOSITE GLASS

Earl L. Fix, New Kensington, and Brook J. Dennison, Tarentum, Pa., assignors to Duplate Corporation, a corporation of Delaware Application April 16, 1930, Serial No. 444,769

4 Claims. (Cl. 18—17)

The invention relates to apparatus for making composite glass and constitutes an improvement on the apparatus shown and described in the application of James H. Sherts, Serial No. 403,510. This apparatus comprises a metal platen heated by means of a fluid, such as steam or hot liquid on which the sheets to be composited are supported and a cover provided with a rubber diaphragm on its lower side which fits over the platen with air pressure means leading to the space behind the diaphragm so that the necessary pressure may be applied by the diaphragm in order to composite the sheets. In this apparatus all the heat necessary for compositing is supplied from beneath the sheets by the heated platen and the pressure is applied from above by the diaphragm. We have found in the use of this apparatus, that the sheets to be composited are not always heated uniformly due to the fact that the contact of the bottom sheet of glass with the platen may not be uniform throughout the area of such sheet or to the fact that the platen itself may not be heated uniformly throughout its area in contact with the glass. Such condition of unequal heating places a strain on the glass tending to produce breakage and may result in the formation of bubbles in the pyroxylin plastic reinforcing sheet where overheating occurs. The object of the present invention is to provide means for avoiding the difficulty as to uneven heating of the sheets as above set forth. Briefly stated, this result is secured by the use of a sheet of metal screen or equivalent material intermediate the platen and the lower glass sheet of the series which is to be composited. The use of the metal screen does not materially reduce the rapidity of heat transmission between the plate and the glass, but it does make such transmission more uniform throughout the area of the platen, so that breakage of the glass and bubbling of the plastic due to localized heating is avoided. One embodiment of the invention is illustrated in the accompanying drawing, wherein:

Figure 1 is a vertical section through the apparatus in open position. Fig. 2 is a similar partial section with the press in closed position. And Fig. 3 is a detail showing a small section of the metal screen employed upon the platen of the press beneath the sheets to be composited.

Referring to the drawing, 1 is the platen of a press similar to that shown in the Sherts application heretofore referred to. This platen constitutes the upper wall of the chamber 2 for the fluid which heats the platen. The fluid is applied through the connections 3, 4 and 5 and may be steam or a liquid heated to a temperature sufficient for the purpose. The upper surface of the platen is provided with a series of grooves 6 all connected with the pipe 7 by means of which the air may be exhausted from the space above the platen preliminary to the application of compositing pressure, as hereinafter described. The platen 1 is mounted in a suitable hollow framework 8 closed on the lower side by the plate 9.

The cover of the device comprises a plate 10 hinged to one of the members 8, as indicated at 11, and provided with a latch bar 12 by means of which the lid may be locked in closed position, at which time the bar 12 may be moved beneath the lugs 13 carried by the member 8. Secured to the lower side of the lid is the rubber diaphragm 14, the edges of such diaphragm lying between the clamping strips 15 secured in position by means of the screws 16. Air is supplied to the space 17 behind the diaphragm by means of the pipe 18 connected to a suitable source of supply. As indicated in Fig. 2, the set of sheets to be composited comprises a pair of glass sheets 19, 19 and an interposed sheet 20 of pyroxylin plastic, the opposing surfaces of the sheets being provided with a suitable cement for sticking them together upon the application of heat and pressure as is well known in the art. Interposed between the bottom sheet of glass 19 and the platen 1 is a sheet of woven metal screen 21, preferably copper, such sheet being somewhat greater in area than that of the sheets to be composited. The sheet 21 serves during the compositing action as a cushion for the lower sheet of glass 19 and prevents such sheet from contacting with the platen 1. The use of this sheet equalizes the heat transmission from the platen to the plates carried thereby and acts as a filler between any voids which may exist between the surface of the platen and the surface of the lower glass sheet. Due to the use of this sheet, any localized overheating of the set of sheets is prevented, such as sometimes otherwise occurs due to some part of the platen becoming overheated. The introduction of strain is thus avoided tending to reduce breakage and the pyralin plastic is uniformly heated so that no bubbling or burning occurs due to localized overheating. In carrying out the operation, the metal screen is placed in position upon the platen and the set of sheets to be composited placed thereon. The lid 10 is then lowered to closed position, as indicated in Fig. 2 and locked by means of the bar 12. The air is next exhausted from the space beneath the diaphragm 14 by means of suitable exhausting apparatus connected to the pipe 7, thus causing the diaphragm to press down upon the plates and expelling any air lying therebetween. While the air is being exhausted, steam or other heating fluid which is admitted to the chamber 2 heats up the platen 1 and the set of sheets carried thereby until the plastic sheet 20 is slightly softened. Air pressure is now admitted to the space 17 through the pipe 18, thus causing the diaphragm 14 to press the sheets 19, 19, 20 tightly together, thus causing their adhesion in the usual way. After this condition has been maintained for a short period, the air pressure as supplied to the chamber 17 is released, the lid 10 is swung up and the composited plate formed of the sheets 19, 19 and 20 is removed, thus completing the cycle. The screen 21 which is employed is preferably of woven copper metal, but any other form of screen having similar characteristics may be substituted. The woven screen is preferred since it has a slight amount of give and gives a cushioning effect. Copper is preferred because of its high conductivity, but other materials may be used. In addition to the functions performed by the screen as heretofore pointed out, it has the further advantage in that it prevents the rubber diaphragm 14 from pressing down upon and closing the grooves 6, 6 which lie beneath the screen. The use of the screen thus assists in exhausting the air from the space beneath the diaphragm and thus withdrawing the air from between the sheets which are to be composited.

What we claim is:

1. Apparatus for making composite glass comprising a metal platen for supporting the sheets to be composited, means for heating the platen, a movable metal cover fitting over the platen and provided on its inner side with a flexible sheet, means for supplying fluid under pressure behind said sheet, and a metal screen upon the platen.

2. Apparatus for making composite glass comprising a metal platen for supporting the sheets to be composited, means for heating the platen, a movable metal cover fitting over the platen and provided on its inner side with a flexible sheet, means for supplying fluid under pressure behind said sheet, and a metal screen upon the platen of an area greater than that of the sheets to be composited.

3. Apparatus for making composite glass, comprising a metal platen for supporting the sheets to be composited, means for heating the platen, a movable metal cover fitting over the platen and provided on its inner side with a flexible sheet, means for supplying fluid under pressure behind said sheet, and a woven metal screen upon the platen adapted to carry the set of sheets to be composited.

4. Apparatus for making composite glass comprising a grooved metal platen for supporting the sheets to be composited, means for heating the platen, a movable metal cover fitting over the platen and provided on its inner side with a flexible sheet, means for supplying fluid under pressure behind the sheet, means for exhausting the air from the grooves in the platen, and a woven metal screen upon the platen of an area greater than the sheets to be composited.

EARL L. FIX.
BROOK J. DENNISON.